March 12, 1963  D. D. CRAYCRAFT  3,080,893
REINFORCED RIGID PLASTIC PIPE
Filed June 29, 1956
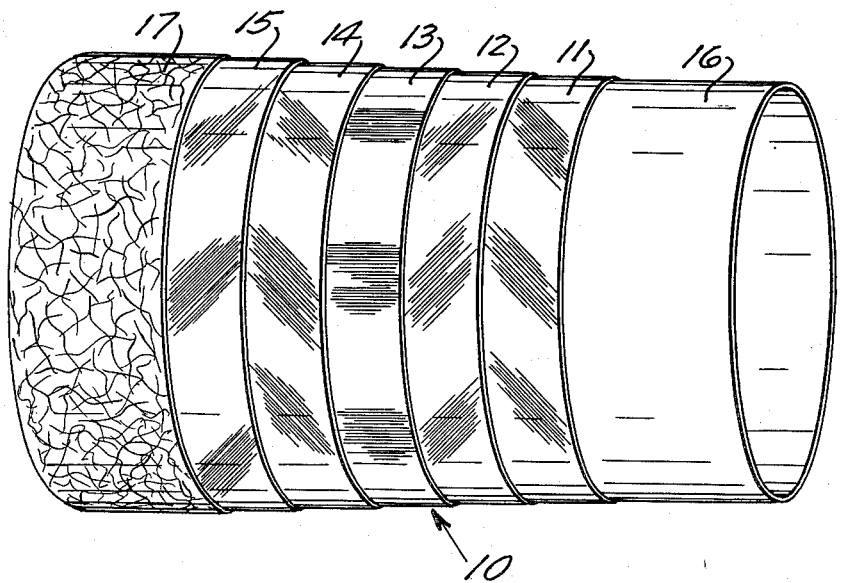
INVENTOR
DONALD D. CRAYCRAFT
BY
Carpenter, Abbott, Coulter & Kinney
ATTORNEYS _United States Patent Office_

3,080,893
Patented Mar. 12, 1963

3,080,893
REINFORCED RIGID PLASTIC PIPE
Donald D. Craycraft, deceased, late of White Bear Township, Ramsey County, Minn., by Donna S. Craycraft, administratrix, White Bear Township, Ramsey County, Minn., assignor to Minnesota Mining & Manufacturing Company, St. Paul, Minn., a corporation of Delaware
Filed June 29, 1956, Ser. No. 594,734
5 Claims. (Cl. 138—141)

This invention relates to reinforced resinous pipe and tubing and particularly to thinwall, high-strength, pressure-resistant, fluid-handling pipe laminated from sheets of resin-impregnated, non-woven, lineally-aligned, continuous glass filaments.

A great need exists for pipe or tubing which is capable of withstanding high internal pressures approaching the pressure resistance of steel pipe but which possesses far greater resistance to corrosive attack than steel. With the comparatively recent development of high strength, chemically-resistant, heat-resistant plastics and synthetic resins, it is not surprising that efforts at providing such pipe have centered about these materials. The potential saving in weight offered in the use of plastics and resins has intensified investigations. Impervious pipes of rather good strength have been cast from resin compositions which are capable of hardening to an essentially infusible, insoluble state, but to be satisfactorily resistant to large internal fluid pressures, the wall must be made undesirably thick. In addition, such pipe has a tendency toward brittleness.

Because fibrous materials have demonstrated utility as reinforcing means in a variety of diverse applications, it has been generally accepted that they would serve to enhance the resistance to internal hydrostatic pressure of any pipe, into the body of which they could be satisfactorily incorporated. This theory has developed from experience with pneumatic tires, rubber and plastic tubing such as common garden hose, and the like, but is misleading and to a large extent invalid in its application to the reinforcing of relatively rigid resinous materials.

Following the theory that fibrous reinforcement would improve the pressure-carrying properties of resinous pipe, widespread research has been directed toward the development of a commercially useful reinforced resinous pipe, particularly pipe reinforced with fibrous glass in view of its low cost, chemical inertness, good adherence to resins, and unusually high tensile strength. Pipes prepared as taught by the prior art using continuous, non-woven, lineally-aligned glass filaments which are essentially contiguous and are bonded to each other by the strongest available thermosetting resin compositions exhibit tensile strengths of more than ten or twenty times those obtainable with the same resins without reinforcement. However, an improvement of far less magnitude, and in some cases no improvement whatsoever, is realized in the maximum pressure at which reinforced resinous pipe will convey fluids without "weeping," as compared to the pressure at which non-reinforced resinous pipe of the same dimension will fail. Ordinarily the latter fails by bursting. Weeping, or slow exudation of droplets of liquid under high or variable pressures through the walls of the pipe, is particularly to be avoided with tubes carrying expensive, corrosive or toxic liquids and is undesirable under any circumstances.

Compositions which harden to a rigid, resinous state can normally be modified by so-called plasticizers to lend a wide range of degrees of flexibility to the cured products, and it may be suggested that such modification be made in the resin of the reinforced pipe. However, in every case in which an appreciable increase in flexibility is realized, such increase depends upon plastic flow, and points of weakness may develop after repeated stress and relaxation, so that pipe fabricated of such material is suited only for use under relatively constant hydrostatic pressures. In addition, the use of plasticizers inevitably renders the resin less resistant to chemical attack and to the effects of heat and moisture and thereby defeats the primary purpose for which reinforced resinous pipe is intended.

It has been suggested that a reinforced pipe may be made more impervious or protected from the action of fluids carried by the pipe by means of a liner, but the problems involved in providing a suitable liner for fluid-handling pipe operating at high pressures are highly complex and not fully appreciated in the prior art. For example, inelastic linings rupture at pressures far below the pressure required to obtain the full reinforcing ability of the reinforced shell. This shortcoming might be overcome by forming the reinforced wall under considerable tension, but the prior art does not disclose means for coping with the many and possibly insurmountable difficulties encountered in attempting to supply such tension to glass filaments in a resinous structure. It is not enough that the liner be capable of elongating sufficiently to transmit pressures to the reinforced wall since in normal use over long periods of time the liner will be subjected to repeated expansion and relaxation, and pressure changes may be quite sudden and accompanied by severe vibration. The liner must be more than the mere equivalent of the inner tube of a pneumatic tire in that some means must be provided to prevent fluids conveyed by the pipe from entering between the liner and reinforced wall at the end of each section of pipe. No discussion of what constitutes a suitable liner, how one is selected, nor how a liner is related to the structure of reinforced resinous pipe has appeared in the prior art.

By the present invention, a thinwall, high strength, reinforced resinous pipe is rendered impervious to corrosive fluids under high and fluctuating pressures and at widely varying temperatures although it may elongate substantially under large internal pressures and may readily transmit mechanical vibration as a result of its relatively rigid structure. The pipe derives its impermeability by virtue of an elastic, impervious, impact-resistant, chemically-resistant and heat-resistant inner liner adherently bonded to and substantially conterminous with the inner surface of the reinforced resinous wall, which liner is capable of remaining firmly adhered to said resinous wall without fracture while conveying corrosive fluids under internal pressures sufficient to elongate the resinous wall to its elastic limit, including rapidly pulsating fluid pressures and considerable accompanying mechanical vibration. Preferably the reinforced resinous wall consists of superposed layers of continuous, non-woven, lineally-aligned glass filaments, which filaments are essentially contiguous and are surrounded and exclusively bonded to each other and to the filaments of adjacent layers by substantially infusible and insoluble resinous material having good adhesion to glass. However, the invention is equally applicable to relatively rigid pipes having resinous walls reinforced by continuous, high tensile fibers other than glass in woven cloth or other fabric in which the fibers are essentially continuous and are maintained in substantially side-by-side relationship.

In a preferred embodiment, the resinous wall includes two sets of oppositely, helically wound layers of continuous glass filaments disposed symmetrically at high angles with respect to the axis of the pipe and a central layer or layers of continuous glass filaments disposed symmetrically and at relatively low angles with respect to the axis of the pipe. For many purposes, a pipe including two central layers disposed at low helical angles is of equal quality to an otherwise identical pipe having a single central layer equal in thickness to the total of the two central layers of low angle, helically-wound filaments, and for such purposes the two pipe structures may be considered to be equivalent. The pipe may be provided with a resin-impregnated surface mat of relatively short, randomly oriented glass fibers to guard against the formation of surface cracks in the resin and to provide a more rugged and esthetically pleasing covering.

It will be appreciated that in some applications the pipe will be exposed to unbalanced torsional stresses which call for modification in filament disposition toward unsymmetry. Proper modification for a particular installation is subject to calculation by one skilled in the art.

A number of methods are available for making the reinforced resinous pipe illustrated in the appended drawing continuously or in long sections either by hand or by machine. Normally, the pipe is formed around a cylindrical foundation in superposed layers, which layers may be applied singly in continuous helices or in a circumferential direction in an expanding spiral. Reinforcing filaments or fabrics may be pre-saturated with resin compositions, or the resin may be applied directly to the preceding layer to flow into the interstices of the filamentary material as it is wound under suitable tension. The material of the non-reinforced inner liner may be wrapped on the cylindrical foundation helically or convolutely, or a preformed liner such as extruded polyvinyl chloride tubing may be utilized. In any event, the inner liner of the finished pipe must be an impervious integral sleeve so that if formed from wraps, each layer thereof must be firmly adhered to adjacent layers as by fusing during curing of the resinous wall of the pipe. Alternatively, an adhesive might be used to bond the layers of liner material firmly together.

Referring now to the drawing, there is shown in perspective a fragment of an exemplary cylindrical pipe 10, portions of which are broken away to illustrate its structure. High strength is imparted to the pipe 10 by virtue of superposed layers 11, 12, 13, 14 and 15 of warps of continuous, lineally-aligned glass filaments bonded together by infusible, insoluble resinous material. The filaments of the two inner layers 11 and 12 are disposed helically and oppositely at angles of about 60 degrees to the axis of the pipe 10, and outer layers 14 and 15 correspond to the layers 11 and 12, respectively. The filaments of the intermediate layer 13 are laid essentially longitudinally with respect to the axis of the pipe 10 and serve to lend strength to the pipe 10 in the longitudinal direction. Adherently bonded to the inner reinforced layer 11 is an impervious liner 16. The surface covering is a resin-impregnated mat 17 of relatively short, randomly oriented and intermingled glass filaments.

Reinforced resinous pipe having the structure illustrated has been fabricated from a number of combinations of materials with excellent results, particularly in resistance to large and rapidly fluctuating internal fluid pressures. In a typical construction of a pipe of two-inch inside diameter the inner liner 16 was built up of smooth, homogeneous calendered film approximately 0.004 inch in thickness formed from a composition prepared by mixing thoroughly the following ingredients:

| | Parts by weight |
|---|---|
| "Geon Polyblend 503H" | 100 |
| "Geon 101 EP" | 100 |
| Polyester plasticizer | 15 |
| Dioctyl phthalate | 15 |
| Basic lead phosphite | 4 |
| Antioxidant | 1.5 |
| Carbon black | 1.0 |
| Light mineral oil | 1.0 |

"Geon Polyblend 503H" is a mixture of 55 parts polyvinyl chloride and 45 parts of the copolymer of butadiene and acrylonitrile (which copolymer is known in the art as "nitrile rubber"). "Geon 101 EP" is polyvinyl chloride and like the "Geon Polyblend" is a product of the B. F. Goodrich Co. The polyester plasticizer was Paraplex G–40, sold by Resinous Products & Chemicals Corp., which is a soft, viscous alkyd resin. The antioxidant used was "Santover A," i.e., di-tert-amyl hydroquinone.

The calendered film was used in strip form and was applied to a cylindrical foundation in a continuous helix with each convolution overlapping four-fifths the previous convolution, thereby providing five layers of material at any point to effect a continuous thickness of 0.020 inch. The layers fused to an integral, cohesive sleeve 16 under the conditions of curing of the resin of the reinforced resinous wall of the pipe as described below.

To promote adhesion, the outward facing surface of the top layer of liner 16 was previously coated with a solution of the following components, all parts being given by weight: 100 parts of the copolymer of 70 parts butadiene and 30 parts acrylonitrile; 47.2 parts of a polymerized beta-pinene resin which melts at 115° C., has a zero acid number, and is known as "Piccolyte S–115"; 1220 parts toluene; and 380 parts methyl ethyl ketone.

The five layers 11, 12, 13, 14 and 15 of the reinforced wall in the typical pipe construction were identical, save for the direction in which their glass filaments were disposed. Each layer included a warp of continuous, nonwoven, lineally-aligned, essentially contiguous glass filaments, viz., untwisted or lightly twisted "Fiberglas" yarns of Owens-Corning 150 1/0 hard silane treated glass filaments having approximately 200 ends per inch of width of warp, each end including 204 filaments of 0.00038 inch average diameter. The filaments of each layer were bonded together by the reaction product of 15 parts of meta-phenylene diamine and 100 parts of epoxy resin ("Epon 828," a product of the Shell Chemical Corporation and believed to be the reaction product of epichlorhydrin and bisphenol) having a melting point of about 8–12° C. as determined by the Durrans' Mercury Method and an epoxide equivalent weight of about 190–210. The surface layer 17 consisted of a dense mat of randomly intermingled glass fibers, specifically a mat presently marketed under the designation "Owens-Corning Surfacing Mat, treatment #4." The mat was saturated with the below identified resinous composition.

At each interface between layers 11, 12, 13, 14, 15 and 17 was a thin additional layer (not shown in the drawing) of the following composition, all parts being given by weight: 100 parts of the epoxy resin described above, i.e., "Epon 828," 30 parts of plastisol grade polyvinyl chloride, i.e., "Geon 121," 1.2 parts basic lead phosphite, and 15 parts metaphenylene diamine. The composition was prepared by first mixing 50 parts of the epoxy resin, 30 parts of polyvinyl chloride and 1.2 parts of basic lead phosphite and then adding another 35 parts of the epoxy resin, all at room temperature. A second mixture was prepared by mixing 15 parts of the epoxy resin with 15 parts of meta-phenylene diamine, each of which was pre-heated to about 140°–150° F., and immediately adding the second mixture to the first, quenching the second mixture. By virtue of the tension under which the glass filamentary material is necessarily applied in the formation of the pipe 10 and because of the fluidity of the resin-forming compositions upon initial heating, the interfacial layers between filament-reinforced layers 11, 12, 13, 14, 15 and 17 are fused into and become indistinguishable from the reinforced layers.

The reaction of the materials in the filament-reinforced wall to a substantially infusible, insoluble resinous state and the fusing of the layers forming the inner liner 16 to an integral sleeve was effected by placing the whole in a circulating-air oven preheated to 350° F. for 1.5 hours.

To enable sections of the reinforced pipe 10 to be detachably coupled in a conventional manner, each may be provided with upset male threads and a wrench-receiving ring behind the threads at each end. Threads and wrench rings may be prepared from laminates of fiber-reinforced material, preferably with essentially the same resin and fibrous reinforcement used in the reinforced wall of the pipe 10. A number of five-foot sections of pipe of the above-described structure having a two-inch inside diameter and about 0.10 inch wall thickness and provided with wrench rings and upset male threads were connected into pressurized water-carrying lines by means of their threads. The specimens were immersed in water heated to 150° F., and the pressure in the lines was varied between 250 and 1000 pounds per square inch at the rate of 34 cycles per minute. The pipe was examined periodically for evidence of leakage. The sections of pipe in almost every case could be cycled at least 100,000 times without leaking, and normally withstood more than 250,000 cycles. The same pipe without a liner was found to leak after the first few cycles in this test.

Since the stresses incurred by the pipe are a good deal more severe than are normally encountered in commercial use, the above-described test serves to indicate the probable performance of the pipe. To test the pipe under actual operating conditions, portions of a large number of existing fluid handling pipe installations have been replaced by sections of threaded reinforced resinous pipe described above. In almost every case, the resinous pipe gives evidence of continued satisfactory service. In one case, 30 feet of reinforced resinous pipe were placed in a sweet crude oil pipe line carrying 350 barrels per day under a wellhead pressure fluctuating between 0 and 250 pounds per square inch at 20 strokes per minute. The pipe also was subjected to substantial mechanical vibration. The pipe withstood over 6 million cycles for a period of more than 7 months.

In another installation, thirty feet of pipe were used to carry salt water at the rate of 100 barrels per day under a pressure of 1100 pounds per square inch. The pipe showed no evidence of damage after service of more than 10 months.

A third installation was used to carry sweet crude oil where paraffin build-up was a particular problem. The section of 40 feet of pipe successfully withstood hot oiling at 175° F. for several hours to remove paraffin and showed no evidence of wear after more than a year of service.

The pipe is resistant to rough handling. Ten and 20 foot sections have been dropped on concrete from heights of more than 5 feet without damage to their fluid-carrying qualities. However, care should be exercised in handling the pipe as it is substantially less resistant to impact than steel pipe. The pipe can be driven over by heavy trucks without injury if properly supported. This durability is realized even though the pipe is approximately one-seventh the weight of steel pipe having a wall thickness of only about 0.10 inch. In addition, the pipe is completely resistant to a wide variety of fluids including dilute sulfuric acid and most common organic solvents.

Both the materials and the structure of the pipe can be varied to a considerable extent without significant change in performance as long as the balance in properties is retained. A pipe was fabricated as described above and utilizing essentially the same liner material except that the liner was formed from a strip 0.007 inch in thickness applied in a single helix with a continuous overlap of about one-eighth of an inch. A different composition was employed as a primer to promote adhesion between the liner and the reinforced resinous wall, namely 100 parts of the copolymer of 60 parts butadiene and 40 parts acrylonitrile; 50 parts "Vinsol Ester Gum," a pine wood resin extract sold by Hercules Powder Co.; 50 parts oil-soluble phenol-aldehyde resin, 10 parts zinc oxide, 10 parts salicylic acid, 448 parts methyl ethyl ketone and 73 parts toluene. This pipe was subjected to the same cycling test, i.e., between 250 and 1000 pounds per square inch, 34 cycles per minute, 150° F., and withstood more than 90,000 cycles. Its ends were protected in the test since the pipe was not provided with threads and was connected into the test system by means of internal plugs.

Even thinner liners of the same composition have proved to be useful in the pipes of this invention. However, a somewhat thicker liner of this material is preferred in view of the lessened risk of imperfection.

Another liner material which shows excellent promise is the copolymer of vinyl chloride and a minor proportion of vinyl acetate, film of such material having excellent resistance to many fluids commonly conveyed by pipe, particularly in the petroleum industry. A pipe was constructed with an inner liner of "Vinylite VYNS," a copolymer of 90 parts vinyl chloride and 10 parts vinyl acetate, laid up helically in six layers of 0.003 inch film. The outer layer was pre-coated with the primer solution used in the pipe described immediately hereinabove. The structural wall of the pipe was identical to that described in detail above. In cycling this pipe between 250 and 1000 pounds per square inch, at 150° F., 34 cycles per minute, more than 60,000 cycles elapsed before any leakage was observable.

A pipe utilizing a "Vinylite VYNS" liner and having the same structural wall as the above-described pipes except for the omission of the interfacial layers of resin between successive layers of resin-impregnated glass filament warps was subjected to a continuous internal fluid pressure of 1000 pounds per square inch for more than 10 months without leakage, at which time the pressure was increased to above 2500 pounds per square inch, rupturing the reinforced wall of the pipe. By the omission of the interfacial resin, this pipe wall contained no so-called "thermoplastic" material such as polyvinyl chloride. It is believed that the inclusion of polyvinyl chloride-containing resin in the structural wall substantially improves the resistance of the pipe to impact.

Many thinwall (about 0.10 inch) pipes fabricated as described above withstand internal pressures of more than 4000 pounds per square inch for short periods without leaking or bursting. However, the peak pressure at which reinforced resinous pipe beings to leak or rupture has been found a poor indication of the performance of te pipe in normal field operation.

It will be appreciated by those skilled in the art that the teachings of this invention are applicable to a variety of reinforced resinous pipe structures utilizing other resin compositions and other fibrous materials and arrangements thereof, including various fabrics and fiber orientations. For example, it may be desired to utilize a resin-forming composition which will cure at room temperature to a thermoset state, e.g., polyester resin. Normally, a heat-reactive resin is preferred in that greater resistance to heat is generally realized therewith.

The inner liner must be chemically resistant to fluids to be conveyed by the pipe and capable of resisting temperatures to which the pipe may be subjected. Brittle materials should be avoided as it is expected that the pipe will often receive rough treatment. The material of the inner liner must be capable of withstanding stresses incurred in fabrication of the pipe due to expansion and contraction of the resinous wall and, if one is used, of the foundation on which the pipe is fashioned, which stresses may tend to delaminate the liner from the resinous wall, to cause the liner to crack or otherwise develop voids or weak areas, and to fail cohesively. Strains tending to delaminate or crush the liner are also encountered due to differences in thermal expansion between the reinforced wall and the liner by virtue of changes between minimum operating temperatures and the maximum temperature to which the pipe is exposed either in operation or fabrication. In addition, the liner must remain impervious and firmly bonded to the reinforced wall in spite of mechanical stresses due to dimensional changes in the pipe from variations in hydrostatic pressure in the fluid being conveyed.

The same considerations apply whether the liner is supplied as a continuous sleeve or in strip form requiring fusing or other means of adhering successive layers into an impervious lining. In either event, it is highly desirable that the deformation of the liner due to mechanical or thermal forces be virtually elastic, except under occasional extraordinary forces, since plastic flow will eventually result in areas of weakness.

What is claimed is:

1. A stiff shape-retaining cylindrical pipe section adapted to be interconnected with similar pipe sections without reduction of internal diameter in the formation of continuous impervious pipeline which is stretchable to accommodate surges of high pressure in fluid conveyed in the pipeline, said pipe section comprising a thin resinous wall reinforced with continuous glass filaments bonded together by substantially infusible and insoluble thermoset resinous material; and, adherently bonded to the resinous wall, an impervious, elastic, thermoplastic, impact-resistant liner comprising a mixture of polyvinyl chloride and nitrile rubber, said liner being free from hydrophilic fibrous matter and being essentially conterminous with the resinous wall and capable of maintaining its integrity and remaining firmly adhered to said resinous wall over a wide range of temperatures while conveying corrosive fluids under pulsating internal pressures sufficient to stretch repeatedly the resinous wall to its elastic limit.

2. A stiff shape-retaining cylindrical pipe section adapted to be interconnected with similar pipe sections without reduction of internal diameter in the formation of continuous impervious pipeline which is capable of withstanding internal pressures pulsating between 250 and 1000 pounds per square inch at the rate of 34 cycles per minute for about 90,000 cycles without failure, said pipe section comprising a thin resinous wall reinforced with continuous, non-woven, lineally-aligned glass filaments bonded together by substantially infusible and insoluble thermoset resinous material; and, adherently bonded to the resinous wall, an impervious, elastic, thermoplastic, impact resistant liner comprising a mixture of polyvinyl chloride and nitrile rubber, said liner being free from hydrophilic fibrous matter and being essentially conterminous with the resinous wall and capable of maintaining its integrity and remaining firmly adhered to said resinous wall over a wide range of temperatures while conveying corrosive fluids under pulsating internal pressures sufficient to stretch repeatedly the resinous wall to its elastic limit.

3. A stiff shape-retaining cylindrical pipe section adapted to be interconnected with similar pipe sections without reduction of internal diameter in the formation of continuous impervious pipeline which is capable of withstanding internal pressures pulsating between 250 and 1000 pounds per square inch at the rate of 34 cycles per minute for about 90,000 cycles without failure, said pipe section having a thickness of about 0.1 inch and comprising a resinous wall reinforced with continuous glass filaments bonded together by substantially infusible and insoluble thermoset resinous material and, adherently bonded to the resinous wall, an impervious, elastic, thermoplastic, impact resistant liner about 0.007 to 0.02 inch in thickness comprising a mixture of plasticized polyvinyl chloride and nitrile rubber, said liner being free from hydrophilic fibrous matter and being essentially conterminous with the resinous wall and capable of maintaining its integrity and remaining firmly adhered to said resinous wall over a wide range of temperatures while conveying corrosive fluids under pulsating internal pressures sufficient to stretch repeatedly the resinous wall to its elastic limit.

4. A stiff shape-retaining cylindrical pipe section adapted to be interconnected with similar pipe sections without reduction of internal diameter in the formation of continuous impervious pipeline which is capable of withstanding internal pressures pulsating between 250 and 1000 pounds per square inch at the rate of 34 cycles per minute for about 90,000 cycles without failure, said pipe section having a thickness of about 0.1 inch and comprising a resinous wall reinforced with superposed layers of continuous, non-woven, lineally-aligned glass filaments bonded together by thermoset epoxy resin, said glass filaments being arranged in at least three superposed layers, the filaments of one layer extending generally in the direction of the axis of the pipe section and the filaments of two layers being disposed helically and symmetrically in opposite directions and at high angles with respect to the axis of the pipe section; and, adherently bonded to the resinous wall, an impervious, elastic, thermoplastic, impact resistant liner about 0.007 to 0.02 inch in thickness comprising a mixture of a major proportion of plasticized polyvinyl chloride and a minor proportion of nitrile rubber, said liner being free from hydrophilic fibrous matter and being essentially conterminous with the resinous wall and capable of maintaining its integrity and remaining firmly adhered to said resinous wall over a wide range of temperatures while conveying corrosive fluids under pulsating internal pressures sufficient to stretch repeatedly the resinous wall to its elastic limit.

5. A pipe section as defined in claim 4, the resinous wall of which is formed with polyvinyl chloride between said superposed layers.

References Cited in the file of this patent

UNITED STATES PATENTS

| | | |
|---|---|---|
| 2,027,961 | Currie | Jan. 14, 1936 |
| 2,467,999 | Stephens | Apr. 19, 1949 |
| 2,552,599 | Stout | May 15, 1951 |
| 2,564,602 | Hurst | Aug. 14, 1951 |
| 2,594,693 | Smith | Apr. 29, 1952 |
| 2,614,058 | Francis | Oct. 14, 1952 |
| 2,642,370 | Parsons | June 16, 1953 |
| 2,653,887 | Slayter | Sept. 29, 1953 |
| 2,664,373 | Reilly | Dec. 29, 1953 |
| 2,730,133 | Holland-Bowyer et al. | Jan. 10, 1956 |
| 2,742,931 | DeGanahl | Apr. 24, 1956 |
| 2,747,616 | DeGanahl | May 29, 1956 |
| 2,783,173 | Walker et al. | Feb. 26, 1957 |
| 2,815,043 | Kleiner et al. | Dec. 3, 1957 |
| 2,887,728 | Usab | May 26, 1959 |

OTHER REFERENCES

E. S. Narracott: Application of Some Epoxide Resins in the Plastic Industry, from "British Plastics," October 1951, 260–45.5 (pages 341–345).